United States Patent [19]

Craig et al.

[11] 4,174,190

[45] Nov. 13, 1979

[54] ANNULAR LINEAR INDUCTION PUMP WITH AN EXTERNALLY SUPPORTED DUCT

[75] Inventors: Edwin R. Craig, San Jose, Calif.; Robert S. Semken, Idaho Falls, Id.

[73] Assignee: The United States of America as represented by the United States Department of Energy, Washington, D.C.

[21] Appl. No.: 811,627

[22] Filed: Jun. 30, 1977

[51] Int. Cl.² .............................................. H02N 4/20
[52] U.S. Cl. ..................................................... 417/50
[58] Field of Search ........................... 417/50; 310/11

[56] References Cited

U.S. PATENT DOCUMENTS

| | | | |
|---|---|---|---|
| 2,786,416 | 3/1957 | Fenemore | 417/50 |
| 3,196,795 | 7/1965 | Baker | 417/50 |
| 3,260,209 | 7/1966 | Rhudy | 417/50 |
| 3,302,573 | 2/1967 | Ledeen | 417/50 |
| 3,372,644 | 3/1968 | Nilson | 417/50 |
| 3,411,447 | 11/1968 | Fox et al. | 417/50 |
| 3,836,286 | 9/1974 | Malaval | 417/50 |
| 3,885,890 | 5/1975 | Davidson | 417/50 |

FOREIGN PATENT DOCUMENTS 2293101  6/1976  France ........................ 417/50

Primary Examiner—William L. Freeh
Assistant Examiner—Edward Look
Attorney, Agent, or Firm—Dean E. Carlson; R. S. Gaither; Clifton E. Clouse

[57] ABSTRACT

Several embodiments of an annular linear induction pump for pumping liquid metals are disclosed having the features of generally one pass flow of the liquid metal through the pump and an increased efficiency resulting from the use of thin duct walls to enclose the stator. The stator components of this pump are removable for repair and replacement.

15 Claims, 5 Drawing Figures

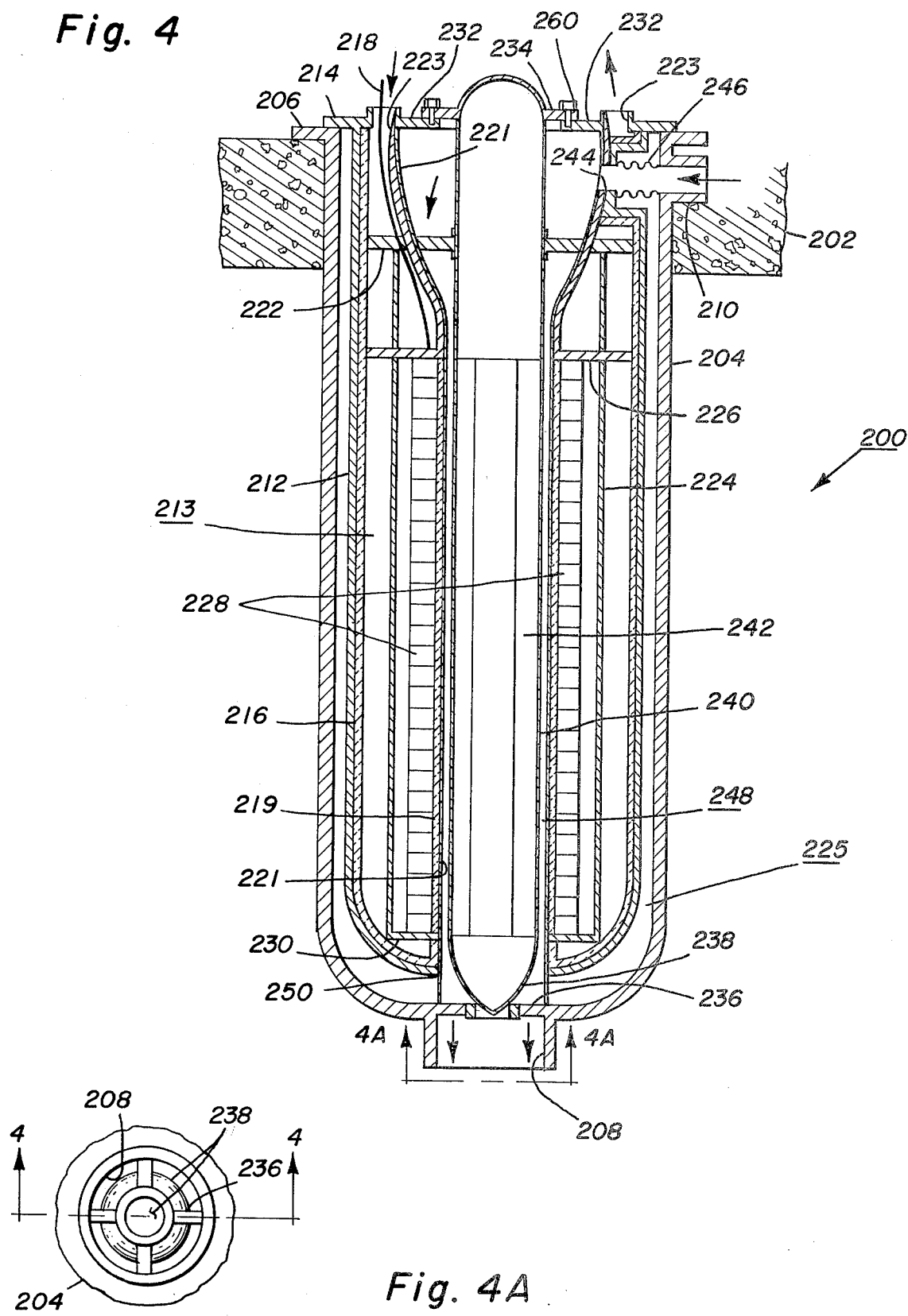

ANNULAR LINEAR INDUCTION PUMP WITH AN EXTERNALLY SUPPORTED DUCT

BACKGROUND OF THE INVENTION

The invention described herein was made in the course of, or under, Contract No. AT(04-3)-893 with the U.S. Energy Research and Development Administration.

This invention relates to an annular linear induction pump useful for pumping liquid metals, such as liquid sodium. In greater detail, this invention relates to an annular linear induction pump of increased efficiency capable of being readily disassembled for repair or replacement of parts and a pump having generally one pass flow of the liquid metal through the pump.

Electromagnetic pumps have been designed in which a single duct is oriented between the pole pieces of a magnet and current is caused to pass through the duct walls. Conductive fluid in the pump is moved in a direction perpendicular to the magnetic flux from the magnet. This causes a force to be exerted on the fluid so that pumping action takes place. Such pumps have no moving parts and are well suited for applications where leakage cannot be tolerated, such as the leakage encountered in conventional pumps. Representative of such applications is the pumping of the liquid metal coolant in fast breeder reactors.

The fact that electromagnetic pumps can perform the function of a mechanical pump while having no bearings, no moving seals, no mechanical moving parts and no need for a free surface or cover gas makes this type of pump extremely attractive. Electromagnetic pumps have a relatively low efficiency (about 45%), which is little more than half the value obtainable from a corresponding mechanical pump. The use of electromagnetic pumps in a liquid metal fast breeder reactor is estimated to reduce the total generating efficiency of the reactor by about 1%. However, the improved availability of electromagnetic pumps in a breeder reactor results in an estimated savings of fifteen days per year of unscheduled reactor outage that would occur when mechanical pumps are used in such a reactor.

There are various types of electromagnetic pumps including helical magnetic pumps, flat linear induction pumps, centrifugal electromagnetic pumps and annular linear induction pumps. Each of the various types of electromagnetic pump has different configurations and preferred applications.

The various alternative electromagnetic pump designs have been compared for use in the main sodium loops in a fast breeder reactor. The flat linear induction pump and the annular linear induction pump are preferred for the larger size pumps (pumps having a capacity of about 90,000 gallons per minute), and the annular linear induction pump with a center return showed the better comparison for this use. The larger the capacity required of a pump, the more attractive the annular linear induction pump is in a liquid metal fast breeder reactor. This is due to the increased diameter of the annulus of the pump to meet the required capacity, and this increased diameter provides more space for iron laminations (also called center iron) inside the annulus.

FIG. 1 represents a prior art annular linear induction pump for use in liquid metal fast breeder reactors. The pump 100 is supported by a fundation 102, such as a metal foundation (or enclosure) enclosing a pool of liquid metal, typically liquid sodium. The pump 100 has a generally cylindrical housing (or pump tank) 104 with a rounded head portion at one end, and the other end has flanges 106 supported on the foundation 102. The housing 104 has an outlet nozzle 108 opening from the rounded head portion. Intermediate between the foundation 102 and the outlet nozzle 108 is inlet nozzle 110.

A stator assembly 112 is positioned inside housing 104 and is comprised of stator 122 held in a stator annulus 123 formed by two cylinders, namely pump support cylinder 116 and duct insulation cylinder 120. Pump support cylinder 116 has a flange 114 supported on flange 106 of housing 104, and angled portion 116' of cylinder 116 is joined to pump duct 118. The portion 120' of duct insulation cylinder 120 in contact with stator 122 is comprised of a layer of insulation covered on each side with a thin layer of stainless steel to shield the stator from the heat of the liquid metal. The stator cooling fluid, such as helium or a suitable liquid such as Dow Therm is introduced through opening 136 in plate 138 and is used to remove heat from the stators 122 after which the fluid is removed through opening 140. The stator 122 receives electric current from electrical leads 124, and the stator 122 is comprised of multiple series of circular copper wire windings encased by magnetic steel (silicon steel) laminations.

The pump duct (pressure bearing duct) 118 is a closed end cylinder connected to center iron shell 126 at junction 128 and the center iron shell 126 supports center iron 130. The pump duct 118 and center iron shell 126 form an annulus 132 that receives the flow of liquid sodium from inlet 110 and the sodium goes through a 180° change in flow direction when it encounters the closed end of pump duct 118 and then flows down center passage 134 of center iron shell 126 and out outlet nozzle 108. The 180° change in flow direction requires pump duct 118 to have an appreciable thickness to withstand the force.

The annular linear induction pump of FIG. 1 loses some efficiency due to the wall thickness of the pump duct 118. This loss of efficiency is caused by (1) the gap between the stator 122 and the center iron 130 and (2) the magnetic flux loss in the duct 118 in the form of generated heat.

This pump also has a flow reversal of the liquid metal (i.e., a flow direction change of 180° for the metal flowing through the pump). It has remained desirable to design annular linear induction pumps not having the loss of efficiency from the thickness of the duct wall and having generally one pass flow of the liquid metal through the pump.

SUMMARY OF THE INVENTION

Annular linear induction pumps built according to the teaching of this invention have increased efficiency due to the use of a very thin insulated duct wall supported on and covering the stator from contact with the liquid metal. The pumps of this invention also have one pass flow of the liquid metal through the pump. There is a 90° change in flow direction of the liquid metal as it flows through the different embodiments of the pump of this invention. This further increases the efficiency of the pump disclosed in this invention and eliminates much of the fluid force on the components of the pump enabling the use of very thin insulated duct walls.

The annular linear induction pump disclosed in this invention is assembled for easy removal of components and, where necessary, repair of replacement of such components. Certain embodiments of the pumps of this invention employ two stators for generating the magnetic flux.

OBJECTS OF THE INVENTION

It is an object of this invention to provide an annular linear induction pump having a thin duct wall between the stator and the center iron.

Another object of this invention is to provide an annular linear induction pump having single pass flow of the liquid metal through the pump.

Still another object of this invention is to provide an annular linear induction pump having in one embodiment an external stator and an internal stator in place of the center iron assembly conventionally employed in such pumps.

Other objects and advantages of this invention will become apparent to a person skilled in the art from a reading of the following description of the invention and the appended claims and by reference to the accompanying drawings.

DESCRIPTION OF THE DRAWINGS

FIG. 4 is an elevation view of another embodiment of the annular linear induction pump of this invention having an elongated external stator assembly being supported by a very thin duct wall.

FIG. 4A is a sectional view taken on line 4A—4A of FIG. 4.

DESCRIPTION OF THE INVENTION

Figure 1:
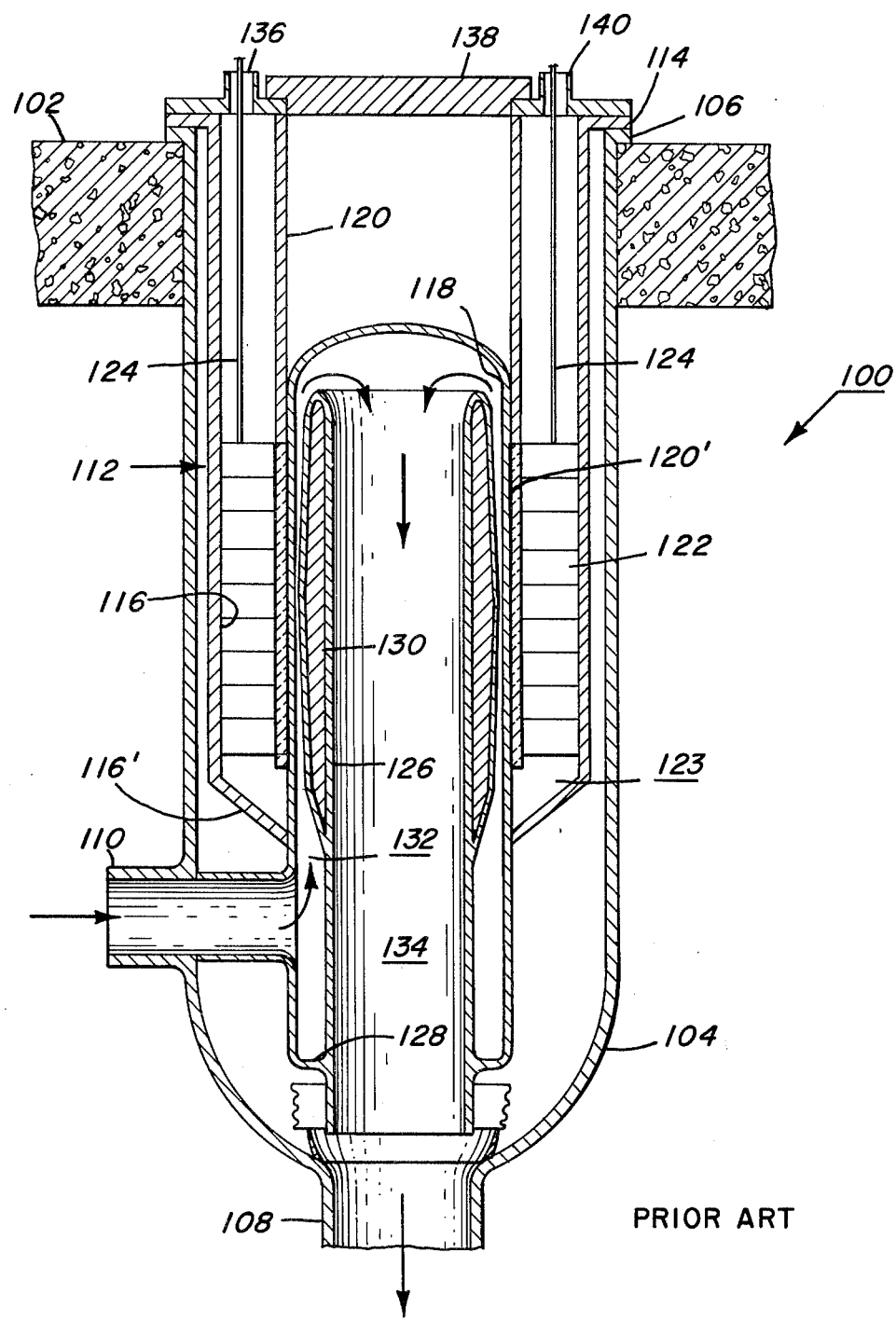
FIG. 1 is an elevation view in section of a prior art annular linear induction pump discussed above in the Background of the Invention.
Figure 2:
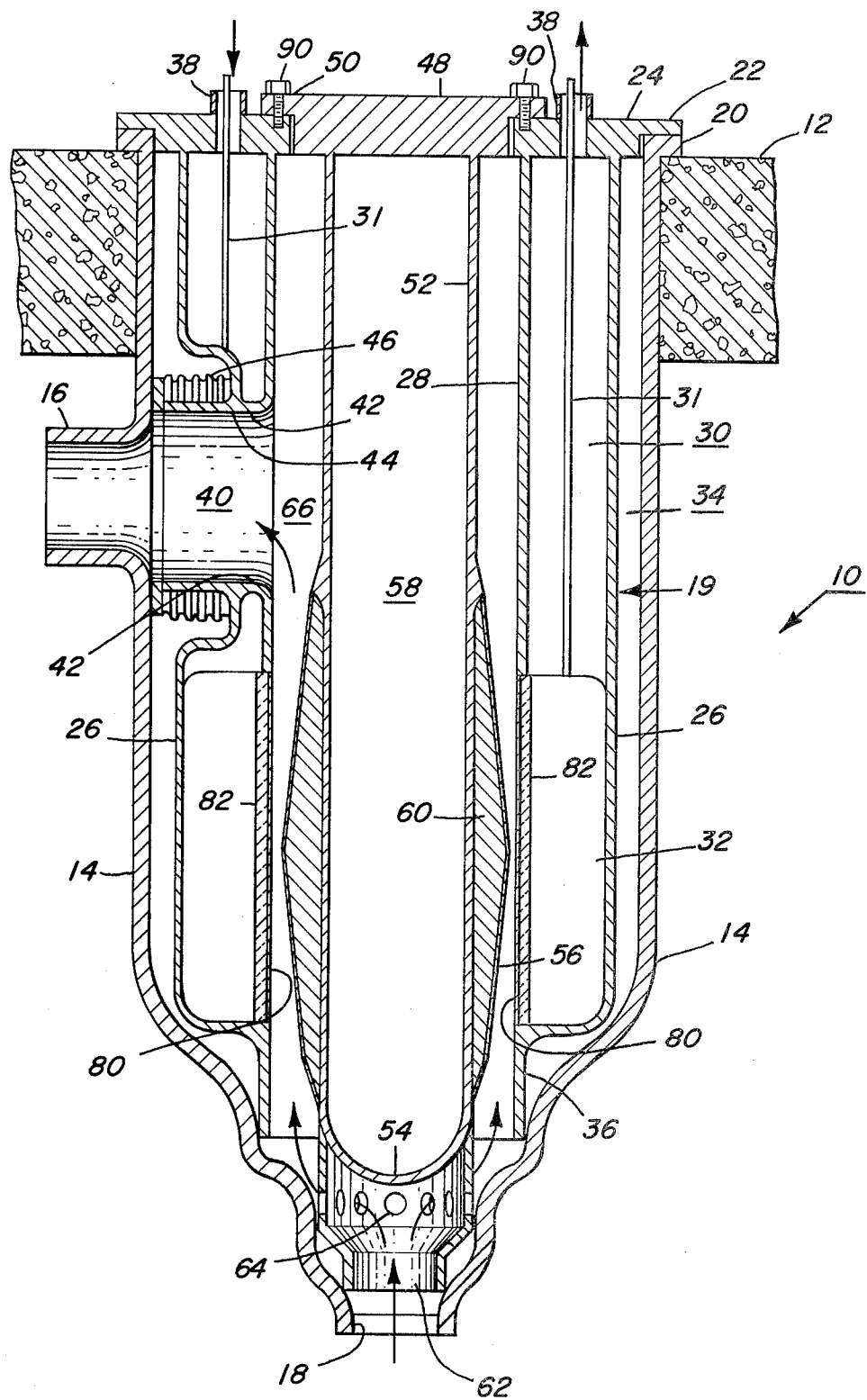
FIG. 2 is an elevation view in section of an annular linear induction pump according to the teaching of this invention.

Referring now to FIG. 2 there is shown an annular linear induction pump (electromagnetic pump) generally designated 10 supported by a foundation 12, such as a metal or concrete foundation. The pump 10 has a generally cylindrical housing (or pump tank) 14 with a flange 20 supported on the foundation 12. The housing 14 has an outlet nozzle 16 intermediate between the ends of the housing 14 and near the foundation 12. The housing 14 has reducing transitions of diminishing cross section ending in the opening forming the inlet nozzle 18.

A stator assembly 19 is positioned inside the housing 14 and is comprised of stator 32 held in a stator annulus 30 formed by two cylinders, namely outer cylinder 26 (pump support cylinder) and duct insulation cylinder 28, both of which are connected to stator head 24. The portion of duct insulation cylinder 28 adjacent stator 32 is comprised of a very thin duct wall 80 (about 30 to about 90 mils thick stainless steel) with a layer 82 of insulation (about 50 to 300 mils thick) positioned between duct wall 80 and stator 32. Each side of the layer 82 is covered with a thin layer of stainless steel. The stator 32 receives electric current from electrical leads 31 and is comprised of multiple series of circular copper wire windings encased by magnetic steel (silicon steel) laminations. A representative stator used in this pump is manufactured by the Large Motor and Generator Department of General Electric Company. The outer cylinder 26 has an extension 36 connected to duct wall 80 and extension 36 contacts the first reducing transition of housing 14 and forms a fluid tight slip fit with the housing 14. Extension 36 of outer cylinder 26 is supported on housing 14 and outer cylinder 26 and housing 14 form outer annulus 34. This extension 36 serves to provide lateral support for the stator assembly 19 and further serves as a guide for inserting the stator assembly 19 into housing 14. Outer cylinder 26 and duct insulation cylinder 28 are attached to stator head 24, and stator head 24 has flanges 22 resting on flange 20 of housing 14. At least two stator coolant openings 38 are provided in the stator head 24 as an inlet and outlet for circulating coolant such as helium to the stator 32. The outer cylinder 26 and the duct insulation cylinder 28 are joined at junction 42 to form an opening 40 allowing the liquid metal to flow to the outlet nozzle 16. An extension 44 extends from the junction 42 to the housing 14, supports bellows 46 and closes the outer annulus 34 to the liquid metal flowing to outlet nozzle 16.

A center iron assembly is comprised of center iron assembly head 48 and attached hollow cylindrical shell (center iron shell) 52. Head 48 is a circular disk having flanges 50 resting on and bolted to stator head 24 by bolts 90. Shell 52 has a rounded closed end 54 and with head 48 defines an empty cavity 58. Shell 52 has attached thereto an outer center iron shell 56 enclosing center iron 60 comprising a multiplicity of high temperature laminations made of Hiperco alloy (an iron-cobalt alloy). A lateral support cylinder 62 extends from the rounded closed end 54 of shell 52 and has flow ports 64 for passage of the liquid metal therethrough. The lateral support cylinder 62 rests on housing 14 in a slip fit. This lateral support cylinder 62 serves to provide lateral support for the center iron assembly and further serves as a guide for assembling the center iron assembly. An inner annulus 66 is formed between the center iron assembly and the stator assembly, and annulus 66 provides a passage for the flow of the liquid metal from the inlet nozzle 18 to the outlet nozzle 16.

In operation a flow of liquid metal as shown by arrows is received in inlet nozzle 18 while current from leads 31 is received by the stator 32. The current is low frequency alternating current in the range of 10 to 20 cycles per second producing a series of electrical poles in the stator at a power level corresponding to the pumping load. The current in the coils of stator 32 provides a magnetic field from stator 32 to center iron 60. The magnetic field goes through the liquid metal in the portion of the annulus 66 adjacent the center iron 60 and the stator 32. The magnetic field sweeping from one electrical pole to the next induces a current flow in the liquid metal in the annulus 66 resulting in forced movement of the liquid metal from the annulus 66 toward outlet nozzle 16. In practice a saturated magnetic field is utilized. This induces a flow rate of at least about 90,000 gallons per minute through the pump. Stainless steel is typically used for the cylinder housing 14, the outer cylinder 26, the duct insulation cylinder 28 (other than the insulation portion), the cylindrical shell 52 and the lateral support cylinder 62.

Figure 3:
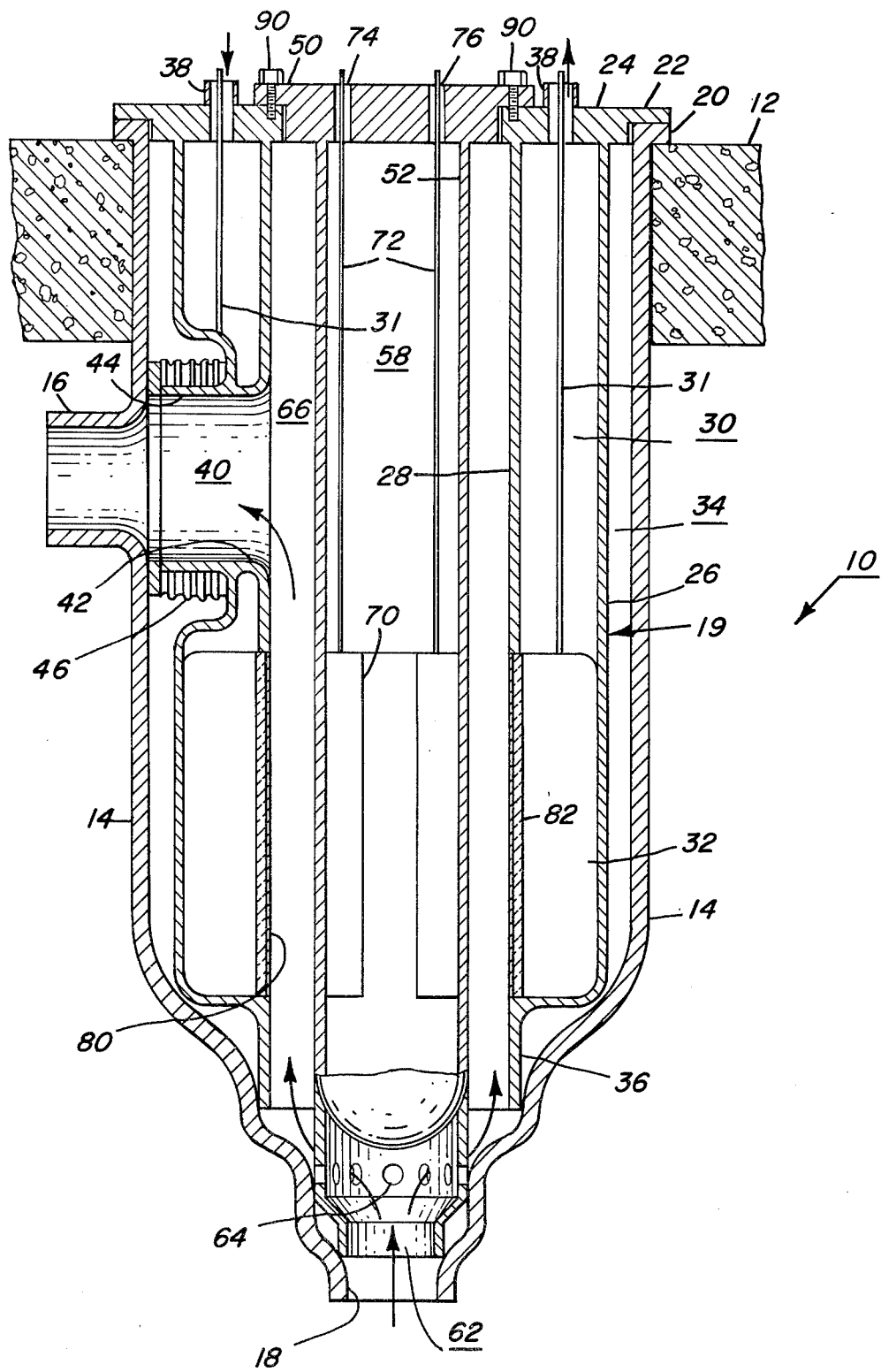
FIG. 3 is an elevation view in section of the annular linear induction pump of FIG. 2 in which an internal stator assembly replaces the center iron assembly of FIG. 2.

Another embodiment of the annular linear induction pump is presented in FIG. 3 in which identical components are identified by the same numbers as used in FIG. 2. In this embodiment the cavity 58 is partially filled with an internal stator 70. The internal stator is cooled by stator coolant fed into and withdrawn from cavity 58 through openings 74 and 76 respectively. The stator 70 consists of a multiplicity of circular copper wire windings encased by magnetic steel (silicon steel) laminations. The internal stator 70 replaces the center iron 60 of the pump in FIG. 2. Electrical leads 72 are provided to bring current to internal stator 70. The internal stator 70 receives low frequency alternating current in the range of 10 to 20 cycles per second at a power level matching the external stator. The current in the coils of the internal stator 70 induces a magnetic field from the stator 70 to the liquid metal in the portion of the annulus 66 between the stators. The magnetic field produced by the stators moves the liquid metal from the annulus 66 toward outlet nozzle 16. In practice a saturated magnetic field is utilized to increase the efficiency of pumping the liquid metal.

Another embodiment of the annular linear induction pump is presented in FIG. 4. The pump 200 is supported by foundation 202 and has a generally cylindrical housing 204. A flange 206 is supported on the foundation 202, and the housing 204 has an outlet nozzle 208 at one end which is rounded and an inlet nozzle 210 on one side adjacent the foundation 202.

A pump tank 212 is held inside housing 204 and has a flange 214 supported on housing 204. The inside surface of pump tank 212 is coated with a layer of thermal insulation 216 that is typically comprised of an inert ceramic material, such as the silica fiber sold by Johns-Mansville under the name Min-K.

A removable elongated stator assembly is comprised of a first (or outer) stator 228 held in a stator annulus 213 formed by pump tank 212 and connected inner member (thin duct cylinder) 221, both of which are joined to a stator head 214. Pump tank 212 is attached to inner member 221 at junction 250 such as by welding.

The outer surface of the inner member 221 adjacent stator 228 is coated with a layer 219 of insulation which runs the full length of member 221. Openings 223 are provided in stator head 214 for introduction of stator coolant to stator annulus 213 and for removing the coolant. Electrical leads 218 enter opening 223 and the stator annulus 213 and are connected to stator 228.

Inner member 221 has an open end near outlet nozzle 208 and is supported on housing 204 near outlet nozzle 208. Inner member 221 provides support for the stator assembly within housing 204. An outer annulus 225 is formed between housing 204, pump tank 212 and the portion of inner member 221 running between pump tank 212 and housing 204 near outlet nozzle 208.

Opening 244 in inner member 221 is connected to inlet nozzle 210 by bellows 246.

The portion of the insulated pump tank 212 near the inlet nozzle 210 supports a duct centering brace ring 222 that is attached to members 224. Members 224 are attached to portions 230 running between insulation 216 and inner insulated member 221. Members 224 are also attached to another ring (second ring) 226. The elongated stator 228 has a multiplicity of stator coils held between second ring 226 and the portions 230 attached to members 224.

Flange 232 leading from inner member 221 provides support for flange 234 of removable elongated center iron support shell 240 at one end, and centering brace 236 in the form of a ring between two connected bars that are affixed to housing 240 (as shown in FIG. 4A) provides support for the venturi end 238 of the center iron support shell 240. A liquid metal flow annulus 248 is formed between center iron support shell 240 and inner cylinder 221. An elongated cylinder of center iron 242 attached to the inside surface of center iron support shell 240 completes the center iron assembly.

In operation a flow of liquid metal is received in inlet nozzle 210 while the stator 228 receives current from electrical leads 218. The current in the coils of the stator 228 produces a magnetic field that goes from the stator 228 to the center iron 242 and passes through the liquid metal in the portion of the annulus 248 adjacent the center iron 242 and the stator 228. The magnetic field induces current in the liquid metal in annulus 248 and results in movement of the liquid metal in annulus 248 to the outlet nozzle 208.

The elongated stator assembly and the elongated center iron assembly serve to apply increased pumping force to the liquid metal in annulus 248. This additional force results in developing a higher pumping pressure.

The flow of the liquid metal has been shown to be in certain directions in the pumps of FIGS. 2-4. However, by reversing the electrical connections to the stators it is possible to reverse the direction of flow of the liquid metal in the pumps from that shown in the Figures.

In summary, the foregoing embodiments of this invention provide an annular linear induction pump of increased hydraulic efficiency as a result of the 90° flow change of the liquid metal through the pump that replaces the 180° change in the direction of flow in the prior pumps. The pumps of this invention retain the desirable feature of a removable stator and a removable center iron (or internal stator). Further this invention provides an annular linear induction pump that can include center iron as shown in FIGS. 2 and 4 or an internal stator centrally located and held by the internal shell as shown in FIG. 3.

The annular linear production pump of this invention has a more compact configuration because the inlet and outlet are generally at opposite ends of the pump.

Another advantage of this invention is that the annular linear induction pump can be in service for higher percentages of the time since the stator assembly can be quickly withdrawn for service and repair, and if another stator assembly is maintained this other stator assembly can be used in place of the assembly being repaired, thus minimizing the time the pump is not working.

As will be apparent to those skilled in the art, various modifications and changes may be made in the method and apparatus described herein. It is accordingly the intention that the invention be construed in the broadest manner within the spirit and scope as set forth in the accompanying claims.

What is claimed is:

1. An annular linear induction pump for pumping liquid metal, comprising:
 (a) a housing having a first opening defining a first open end with the opposite end being open and having toward said first open end a second opening;
 (b) a stator assembly comprising a stator held in a fluid tight annular container with a fluid coolant inlet and a fluid coolant outlet enabling contacting said stator with a fluid coolant to cool said stator, said stator assembly having a thin duct wall covering the stator from contact with the liquid metal and being removably held in said housing and filling a portion of said first open end of said housing, and during operation said stator being capable of developing a magnetic flux and a series of electrical poles therein, said container including an outer wall and an inner wall, said inner wall including said thin duct wall, and said stator being held within said container integral therewith for removal with said assembly from said housing; and (c) means for receiving magnetic flux created during operation of said stator removably positioned in the housing inside said annular container to complete filling said first open end of said housing and leaving a liquid metal flow annulus between said annular container and said means for receiving a magnetic flux, which annulus connects said openings in said housing for one pass flow of fluid through said housing, with said means for receiving a magnetic flux being capable of having induced therein magnetic paths corresponding to said poles of said stator.

2. An annular linear induction pump according to claim 1 in which said housing is generally cylindrical.

3. An annular linear induction pump according to claim 1 in which the means for receiving magnetic flux is a center iron assembly comprised of a hollow cylindrical shell having attached thereto a multiplicity of high temperature laminations.

4. An annular linear induction pump according to claim 3 in which the laminations are comprised of an iron-cobalt alloy.

5. An annular linear induction pump according to claim 1 in which the means for receiving magnetic flux from said stator is a second stator.

6. An annular linear induction pump according to claim 1 in which the open end of the housing is fitted with a cover comprised of a stator head in a fluid-tight fit with a center iron assembly head and the stator head has openings therein serving as a stator coolant inlet and an outlet so that said stator can be contacted with stator coolant.

7. An annular linear induction pump according to claim 1 in which the fluid tight container holding the stator is in the form of concentric cylinders connected at one end with the other end being connected to a stator head.

8. An annular linear induction pump according to claim 1 in which the duct wall is comprised of a material resistant to reaction with liquid sodium and has a thickness in the range of 30 to about 90 mils.

9. An annular linear induction pump according to claim 8 in which the material is comprised of stainless steel.

10. An annular linear induction pump according to claim 1 in which the container of the stator assembly is in the form of concentric cylinders closed at one end and each cylinder has an opening therethrough that is sealed off from the rest of the volume of the container and bellows means runs between one of the openings in the housing and the sealed-off opening of the container.

11. An annular linear induction pump according to claim 1 in which the means for receiving magnetic flux is a center iron assembly comprised of a center iron assembly head having attached thereto a cylindrical shell having a rounded closed end, the shell having attached thereto a multiplicity of high temperature non-cobalt laminations in the area adjacent the stator held in the stator assembly.

12. An annular linear induction pump according to claim 11 in which a lateral support cylinder having a multiplicity of holes therein is connected to the rounded end of the cylindrical shell and forms a slip fit with the housing at one of the openings in said housing.

13. An annular linear induction pump according to claim 1 in which the means for receiving magnetic flux is a center iron assembly comprised of a center iron assembly head having attached thereto a cylindrical shell having a venturi closing at the other end and being supported by a bracket in one of the openings in the housing, and said shell having attached thereto a multiplicity of high temperature iron-cobalt laminations in the area adjacent the stator held in the stator assembly.

14. An annular linear induction pump according to claim 1 in which the means for receiving magnetic flux is an assembly comprised of an assembly head having attached thereto a cylindrical shell having a rounded closed end with a second stator being attached inside the cylindrical shell adjacent the stator held in the stator assembly.

15. An annular linear induction pump according to claim 1 in which said thin duct wall is of a thickness that is less than the thickness of said outer wall.

* * * * *